Patented Nov. 29, 1949

2,489,567

UNITED STATES PATENT OFFICE 2,489,567

INORGANIC POLYSULFIDE-ORGANIC DIHALIDE REACTION PRODUCT

Nicholas Ernster, Phoenix, Ariz., assignor to Heveatex Corporation, Melrose, Mass., a corporation of Massachusetts No Drawing. Application November 2, 1946, Serial No. 707,523

11 Claims. (Cl. 117—161)

The present invention relates to improved synthetic elastomeric compositions and methods of making the same, and more particularly concerns novel dispersions or suspensions formed by reaction of an inorganic polysulfide with an organic dihalide in a liquid medium, and to novel compositions formed from such dispersions.

It has been known heretofore that by reacting inorganic polysulfides and organic dihalides in an aqueous medium there can be produced latex-like dispersions or suspensions of rubber-like polymers which, like natural rubber latex, are subject to coagulation by acid, forming rubber-like sheets or masses useful as rubber substitutes in the manufacture of many products. The dispersions or suspensions of these polymers as heretofore produced commercially have been highly unstable and have not found substantial use for coating purposes since films formed therefrom are subject to excessive sagging under heat, and cracking and breaking on drying, and have poor adhesive power.

The present invention provides novel reaction products of inorganic polysulfides and organic dihalides having new and improved properties such that suspensions or dispersions thereof in a liquid medium are highly useful as coating media as will hereinafter more fully appear. Films formed from these suspensions or dispersions are non-cracking, highly continuous, coherent, elastic, non-sagging and strongly adhesive. Moreover, these suspensions or dispersions, unlike natural latex, possess good stability to both acid and alkali and may be stored for long periods in a neutral, acid or alkaline condition.

I have discovered that the novel reaction products of the invention may be obtained by reacting together an organic dihalide and an alkali or alkaline earth metal polysulfide having more than one and not more than six sulfur atoms in the molecule, or two or more members of these classes, while in solution or dispersion in an inert liquid and in the presence of a relatively small quantity of silica gel. Typically, the reaction medium is water. As a result of the reaction, an aqueous suspension or dispersion of the reaction product is produced. This reaction product may be purified by removal of unreacted ingredients by causing the particles of reaction product to settle by treatment with an acid, washing the impurities from the sedimented particles and then redispersing the sedimented particles in an inert liquid such as water.

The following examples are given by way of illustration of the invention:

Example 1

2 mols. of $Na_2S_4$ in solution are added to 1000 cc. of water in a 5-liter 3-neck flask provided with means for agitation and with a reflux column and a thermometer. Agitation is begun and 220 grams (slightly less than 2 mols.) of 1,3-dichloropropane are added rapidly and then 15 to 40 grams of a 3% aqueous silica gel added immediately thereafter. After about 1 to 2 minutes, 20 to 80 grams of a 10% casein solution are added and a hot water bath is applied to the flask. Agitation is continued until the temperature has risen to about 170° F. Heating is continued without agitation to about 180–184° F., at which point the reaction mass becomes ebullient. Great care should be exercised at this stage of the reaction because with agitation the reaction at this stage will become violent. No rise in temperature occurs during this stage of the reaction. The corresponding critical temperature for 1,2-dichloroethane is 160–164° F., and for 1,4-dichlorobutane is 200–204° F. After about ten minutes, heating by means of the water bath may be resumed. With additional heat, the reaction continues for some time, then diminishes, and finally stops. During this latter stage of the reaction the temperature should rise to about 183° F. The product is a nearly white, chalky, stable dispersion of extremely fine particle size which does not settle on standing.

The particles of the reaction product can be separated from unreacted ingredients and other contaminants by slowly and carefully acidifying the dispersion with a dilute acid, such as a mineral acid or acetic acid, until a faint reaction with Congo red occurs. At this point the particles of the reaction product will settle out slowly as a fine white precipitate. This precipitate may be washed free of contaminants with water by decantation. If the acid is added too quickly, or in an amount which will produce a pH less than about 1, a flocculent precipitate is formed which after a few decantations reverses to a fine white precipitate, retaining some occluded acid which may, if desired, be neutralized with a few drops of dilute alkali.

Example 2

A polysulfide consisting essentially of $Na_2S_4$ in solution and prepared from 480 grams of sodium sulfide crystals (2 mols), 450 ml. of $H_2O$ and 192 grams of sulfur, is added to 1,000 cc. of water in a 5-liter 3-neck flask provided with means for agitation and reflux and with a thermometer. To this solution is added 197.7 grams (2 mols) of 1,2-dichloroethane and then 10 to 80 grams of a silica gel suspension containing 3 grams of silica gel in 100 grams of water. After thorough mixing, with agitation, 20 to 80 grams of a 10% casein solution are added promptly and then water is added until the reaction volume is 1200 cc. to 2000 cc. per mol of $Na_2S_4$ present. The whole mass is agitated for about 5 to 10 minutes. Then the flask is heated slowly to 120–140° F. and this temperature held for 2 to 3 hours with continuous or intermittent agitation. The color of the reaction liquid changes to a light canary yellow. The resultant product is stable and does not settle upon cooling.

The product of Example 2 may be freed of reaction impurities by careful treatment with acid and washing with water as described above in Example 1.

*Example 3*

6 grams of a 40% sodium silicate solution are added to 200 cc. of water in a 3-neck flask provided with an agitator, thermometer and a reflux column, and having a capacity of 5 liters. The agitator is operated continuously. The mixture is heated to 40° C. with agitation and dilute acetic acid added slowly in an amount sufficient to give a faint acid reaction which remains permanent for at least 10 minutes. To the resulting silica gel dispersion, containing approximately 1 gram of silica gel, there is added a sodium polysulfide solution prepared from 480 grams of sodium sulfide crystals, 190 grams of sulphur and 500 grams of water. The addition of the polysulfide solution is followed quickly by the addition of 220 grams of 1,3-dichloropropane and 60 to 80 grams of a 10% casein solution. Enough water is added to bring the total volume of the reaction mixture to 3800 cc. The reaction flask is heated by means of a water bath and the reaction carried on by the same procedure as described in detail in Example 1.

The proportions of silica gel employed in the processes of Examples 1, 2 and 3 are illustrative of desirable amounts of this modifying agent. Larger or smaller amounts may be used. It has been found that the minimum amount of silica gel which is effective for the purposes of the invention is about 5 grams of a 3% aqueous silica gel, or an equivalent amount, per mol of dihalide. The optimum amount appears to be about 12 to 15 grams of a 3% silica gel, or an equivalent amount, per mol of dihalide. Quantities greater than these amounts do not appear to improve the process or the product in any way.

The organic dihalide and the inorganic disulfide are preferably present in the reaction mixture in substantially equivalent molecular proportions.

The organic dihalides employed in the processes of the foregoing examples are illustrative of organic dihalides which are useful and operative in the process. Any of the numerous alkyl and aryl dihalides well known in the art as suitable for reaction with inorganic polysulfides to form plastic compositions may be employed. For example, I may use other dihalides than those mentioned, such as 1,5-dichloropentane, 1,4-dichlorobutane, etc. Dihalides formed from other halogens than chlorine may be used. Symmetrical dihalides in which the halogen atoms are attached to the end carbon atoms are preferred.

The casein employed in the processes of the foregoing examples serves merely as an emulsifying agent for the dihalide. It may be replaced entirely by starch, sodium silicate and other dispersing agents well known in the art.

The particles of the reaction product of the present invention, when observed under the microscope at a magnification of about 800x, have been found to be almost perfectly spherical in shape. The particles also show what appears to be a very small dark spot at the center of the particle. The smaller particles are about 1 micron or less in diameter and show distinct Brownian movement. The larger particles may have diameters up to about 3 to 5 microns.

The dispersions formed in the presence of a silica gel in accordance with the present invention possess good stability to both acid and alkali. These dispersions, after purification as described, can be stored in a neutral, acid or alkaline condition for long periods without undergoing change.

Dispersions formed in accordance with the foregoing examples have been subjected to pH conditions from approximately 1 to 13. In the acid range they assume a pasty form without, however, undergoing coagulation, which would occur with natural hevea latex, for example, under similar treatment. On the alkaline side, the dispersions are less viscous. Again, they do not undergo coagulation. The stability of the dispersions within these ranges may be affected by certain factors. For example, caustic alkalis cannot be used to produce the alkaline condition because they attack the sulfur in the polymer. However, the dispersions may be rendered strongly alkaline by the use of ammonia without danger of decomposition. Also, the polymer probably would not remain stable under extreme acid conditions for an indefinite length of time because of a tendency toward a very slow change from dispersed to coagulated form. For all practical purposes, however, the dispersions may be considered to be stable on the acid side since they may be kept under acid conditions for periods of weeks, or longer.

The dispersions may be formed into a continuous solid film by drying. Such films are semitransparent or translucent, and are free from sagging tendencies, either hot or cold. The dried material is elastic. Films of the material are highly adhesive and will adhere strongly to wood, stone, and metals, even to metals such as zinc, to which many film-forming materials show poor adhesion. The films also are strongly adherent to the conventional paints, lacquers, and enamels.

The dried films are highly continuous in nature and resistant to passage of aqueous liquids and organic solvents therethrough. They are also resistant to the solvent action of organic solvents such as gasoline and other petroleum products, the hydrocarbons, aromatic hydrocarbon solvents, oils, dilute acids, alkalis, etc.

Because of these desirable physical and chemical characteristics, films formed from the dispersions of the present invention are useful in protecting surfaces from corrosion by the atmosphere, by sea water, or under other influences. These films have found a valuable application in the coating of metallic ships' bottoms and have been found to protect the metal from rusting for periods ranging from several months to a year or longer.

Films formed from the dispersion are also useful as priming and anchoring coatings for use on metals, wood, stone, concrete, brick, artificial stone, and other materials. Paint, lacquers and enamels are strongly adherent to such priming or anchoring coatings.

I have found that my dispersions are compatible in all proportions with natural and synthetic rubber latices and with most types of resin emulsions. Films formed from mixtures of rubber latex, or a resin emulsion, with the dispersions of the present invention show a drier feel and increased adhesiveness as compared with similar films formed from rubber latex or resin emulsion alone.

The foregoing detailed description of particular processes is given by way of illustration and not of limitation. Modifications in the times, temperatures, concentrations and other conditions can be made by those skilled in the art without departure from the invention as expressed in the following claims.

I claim:

1. A process for the production of a stable polysulfide dispersion which comprises reacting an inorganic polysulfide having more than one and not more than six sulfur atoms in the molecule with an organic dihalide in an aqueous medium in the presence of silica gel.

2. A process for the production of a stable polysulfide dispersion which comprises reacting an inorganic polysulfide having more than one and not more than six sulfur atoms in the molecule with an organic dihalide in substantially equivalent molecular proportions in an aqueous medium in the presence of silica gel.

3. A process for the production of a stable polysulfide dispersion which comprises reacting an inorganic polysulfide having more than one and not more than six sulfur atoms in the molecule and an organic dihalide in an aqueous medium in the presence of silica gel and a dispersing agent.

4. A process for the production of a stable polysulfide dispersion which comprises reacting an alkali metal polysulfide having more than one and not more than six sulfur atoms in the molecule and 1,2-dichlorethane in an aqueous medium in the presence of silica gel.

5. A stable aqueous dispersion containing a reaction product of an inorganic polysulfide having more than one and not more than six sulfur atoms in the molecule and an organic dihalide, which reaction product has been formed in an aqueous medium in the presence of a silica gel, said dispersion being stable at all alkalinities between pH 1 and pH 13 in the absence of an added stabilizing agent.

6. A stable aqueous dispersion of a reaction product of an inorganic polysulfide having more than one and not more than six sulfur atoms in the molecule and an organic dihalide in substantially equivalent molecular proportions, which reaction product has been formed in an aqueous medium in the presence of a silica gel, said dispersion being stable at alkalinities between pH 1 and pH 13 in the absence of an added stabilizing agent.

7. A stable aqueous dispersion containing a reaction product of an inorganic polysulfide having more than one and not more than six sulfur atoms in the molecule and an organic dihalide, which dispersion contains silica gel and is stable at alkalinities between pH 1 and pH 13.

8. A stable aqueous dispersion of a reaction product of an alkali metal polysulfide having more than one and not more than six sulfur atoms in the molecule and 1,2-dichlorethane, which reaction product has been formed in an aqueous medium in the presence of a silica gel, said dispersion being stable at alkalinities between pH 1 and pH 13 in the absence of an added stabilizing agent.

9. The method of protecting a surface which comprises providing said surface with a coating of a reaction product of an inorganic polysulfide having more than one and not more than six sulfur atoms in the molecule selected from the class consisting of alkali and alkaline earth metal polysulfides, and an organic dihalide in substantially equivalent molecular proportions, which reaction product has been formed in an aqueous medium in the presence of a silica gel.

10. The method of protecting a metallic surface from corrosion which comprises providing said surface with a coating of a reaction product of an inorganic polysulfide having more than one and not more than six sulfur atoms in the molecule and an inorganic dihalide, which reaction product has been formed in an aqueous medium in the presence of a silica gel.

11. The method recited in claim 9 wherein said reaction product is present only in a priming coating.

NICHOLAS ERNSTER.

REFERENCES CITED

The following references are of record in the file of this patent:

UNITED STATES PATENTS

| Number | Name | Date |
|---|---|---|
| Re. 19,207 | Patrick | June 12, 1934 |
| 2,026,875 | Ellis | Jan. 7, 1936 |
| 2,108,468 | Becker | Feb. 15, 1938 |
| 2,195,380 | Patrick | Mar. 26, 1940 |
| 2,386,287 | Blanco | Oct. 9, 1945 |
| 2,419,060 | Edwardes | Apr. 15, 1947 |

FOREIGN PATENTS

| Number | Country | Date |
|---|---|---|
| 572,987 | Great Britain | Nov. 1, 1945 |